(12) United States Patent
Ohkubo et al.

(10) Patent No.: US 7,190,930 B2
(45) Date of Patent: Mar. 13, 2007

(54) RADIO COMMUNICATION SYSTEM, COMMUNICATION TERMINAL APPARATUS, BASE STATION APPARATUS, AND TRANSMISSION POWER CONTROL METHOD

(75) Inventors: Shinzo Ohkubo, Kanagawa (JP); Hitoshi Yoshino, Kanagawa (JP); Shiro Kikuchi, Kanagawa (JP); Toru Otsu, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 530 days.

(21) Appl. No.: 10/398,216

(22) PCT Filed: Aug. 9, 2002

(86) PCT No.: PCT/JP02/08194

§ 371 (c)(1),
(2), (4) Date: Apr. 9, 2003

(87) PCT Pub. No.: WO03/015314

PCT Pub. Date: Feb. 20, 2003

(65) Prior Publication Data

US 2004/0009784 A1 Jan. 15, 2004

(30) Foreign Application Priority Data

Aug. 10, 2001 (JP) ............................. 2001-244746

(51) Int. Cl.
*H04B 17/00* (2006.01)

(52) U.S. Cl. .................. 455/67.11; 455/522; 455/503; 370/318; 370/252

(58) Field of Classification Search ............... 455/522, 455/503, 69, 67.11, 67.14; 370/318, 252, 370/332, 333, 335, 390
See application file for complete search history.

(56) References Cited

U.S. PATENT DOCUMENTS

| 5,881,368 | A | 3/1999 | Grob et al. | |
| 5,892,774 | A | 4/1999 | Zehavi et al. | |
| 6,253,077 | B1* | 6/2001 | Burt et al. | 455/424 |
| 6,650,906 | B1* | 11/2003 | Bousquet et al. | 455/522 |
| 6,959,199 | B2* | 10/2005 | Ohkubo et al. | 455/522 |

FOREIGN PATENT DOCUMENTS

| CN | 1228209 | 9/1999 |
| CN | 1240072 | 12/1999 |
| JP | 10-505206 | 5/1998 |
| JP | 2000-138632 | 5/2000 |
| JP | 2000-511733 | 9/2000 |
| JP | 2001-506096 | 5/2001 |
| KR | 2000-0016551 | 3/2000 |
| WO | WO 95/31070 | 11/1995 |

* cited by examiner

*Primary Examiner*—Matthew Anderson
*Assistant Examiner*—Sanh Phu
(74) *Attorney, Agent, or Firm*—Oblon, Spivak, McClelland, Maier & Neustadt, P.C.

(57) ABSTRACT

The present invention relates to a radio communication system comprising base stations and mobile stations and a method for controlling transmission power in the system where the base station is able to perform multi-point transmission for transmitting the same signal to a plurality of the mobile stations. In the present invention, the mobile station targeted for the multi-point transmission provides the base station of an increase request or a decrease request of the transmission power by respectively transmitting or not transmitting a predetermined signal to the base station.

31 Claims, 17 Drawing Sheets

FIG.11

| | REQUEST VALUE OF CONTROL [dB] | TRANSMISSION POWER CONTROL SIGNAL | OPERATION OF SWITCH 803 | REQUEST SIGNAL |
|---|---|---|---|---|
| (a) | −2 | 000 | CONNECTION OFF | NO OUTPUT |
| (b) | −1 | 001 | CONNECTION OFF | NO OUTPUT |
| (c) | ±0 | 010 | CONNECTION OFF | NO OUTPUT |
| (d) | +1 | 011 | CONNECTED TO OUTPUT TERMINAL OF CODE GENERATING PART (PN #1) | CODE SEQUENCE PN #1 IS OUTPUT |
| (e) | +2 | 100 | CONNECTED TO OUTPUT TERMINAL OF CODE GENERATING PART (PN #2) | CODE SEQUENCE PN #2 IS OUTPUT |
| (f) | +3 | 101 | CONNECTED TO OUTPUT TERMINAL OF CODE GENERATING PART (PN #3) | CODE SEQUENCE PN #3 IS OUTPUT |
| (g) | +4 | 110 | CONNECTED TO OUTPUT TERMINAL OF CODE GENERATING PART (PN #4) | CODE SEQUENCE PN #4 IS OUTPUT |
| (h) | +5 | 111 | CONNECTED TO OUTPUT TERMINAL OF CODE GENERATING PART (PN #5) | CODE SEQUENCE PN #5 IS OUTPUT |

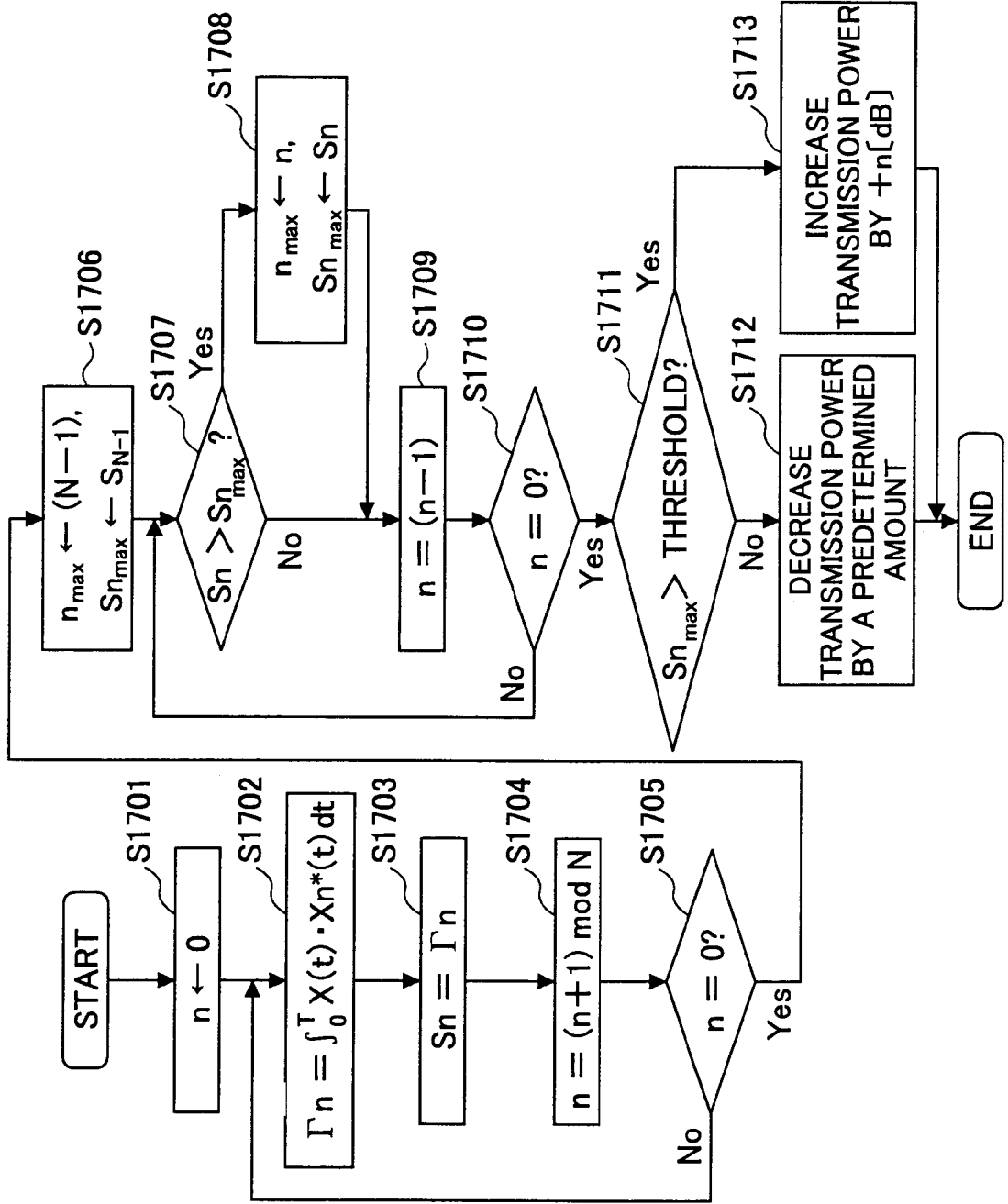

RADIO COMMUNICATION SYSTEM, COMMUNICATION TERMINAL APPARATUS, BASE STATION APPARATUS, AND TRANSMISSION POWER CONTROL METHOD

TECHNICAL FIELD

The present invention relates generally to transmission power control in a radio communication system adapted for the Code Division Multiple Access (CDMA) method (hereinafter referred to merely as a "CDMA radio communication system") and more particularly to a method and apparatus for controlling the transmission power in which a mobile station uses a code sequence assigned separately for each multi-point transmission group to provide a base station of its transmission power control request in the CDMA radio communication system adapted for multi-point transmission where the base station transmits the same signal to a plurality of mobile stations.

BACKGROUND ART

As known widely, in the CDMA radio communication system, it is indispensable to perform the transmission power control (especially in uplinks) in order to reduce interference.

In a conventional CDMA radio communication system, the mobile station determines whether to request the base station to increase or decrease the transmission power on the basis of receiving quality of signals from the base station, and then transmits a transmission power control signal representing an increase request or a decrease request to the base station.

An example of such processing is shown in FIG. 1. Each mobile station determines whether the receiving quality is good or not by comparing it with a predetermined threshold, and then transmits the transmission power control signal representing the decrease request when the receiving quality exceeds the threshold, while it transmits one that represents the increase request when the receiving quality is lower.

The base station, which receives such transmission power control signal, controls its transmission power used for the sending mobile station of that transmission power control signal in accordance with the increase or decrease request that is represented in the received signal.

In the conventional CDMA radio communication system, a spreading code is assigned separately for each mobile station. For example, in the example shown in FIG. 1, signals transmitted from Mobile Station #1 are spread by Code #1, while ones from Mobile Station #2 are spread by Code #2.

In such case where a separate spreading code is assigned for each mobile station, orthogonality among the spreading codes becomes weak and the interference increases in the uplink when the number of the mobile stations increases and hence the number of the spreading codes required increases.

DISCLOSURE OF THE INVENTION

It is an object of the present invention to provide the method and apparatus for controlling the transmission power that solve the above-mentioned problem when the CDMA radio communication system performs multi-point transmission.

Here, multi-point transmission means a transmission method for transmitting the same signal from a single base station to a plurality of the mobile stations at a time, and is considered to be employed in, for example, a multicast information distribution service that has recently become widely watched.

The above object is achieved by a radio communication system comprising base stations and mobile stations where the base station is able to perform multi-point transmission for transmitting the same signal to the plurality of the mobile stations, wherein the mobile station targeted for the multi-point transmission provides the base station with the increase or decrease request of the transmission power by transmitting or not transmitting a predetermined signal to the base station.

Here, the above-mentioned predetermined signal may be an arbitrary bit sequence, for example.

Other objects, features, and advantages of the present invention are elucidated in the following detailed description with reference to the accompanied figures.

BRIEF DESCRIPTION OF THE DRAWINGS

FIG. 11 is a diagram showing an example of the relationship between PN code sequences and amounts of control of the transmission power;

FIG. 17 is a flowchart showing a flow of a correlation detecting process according to the seventh embodiment of the present invention.

PREFERRED EMBODIMENTS FOR CARRYING OUT THE INVENTION

The embodiments of the present invention are described hereinafter with reference to the accompanying drawings.

Figure 2:
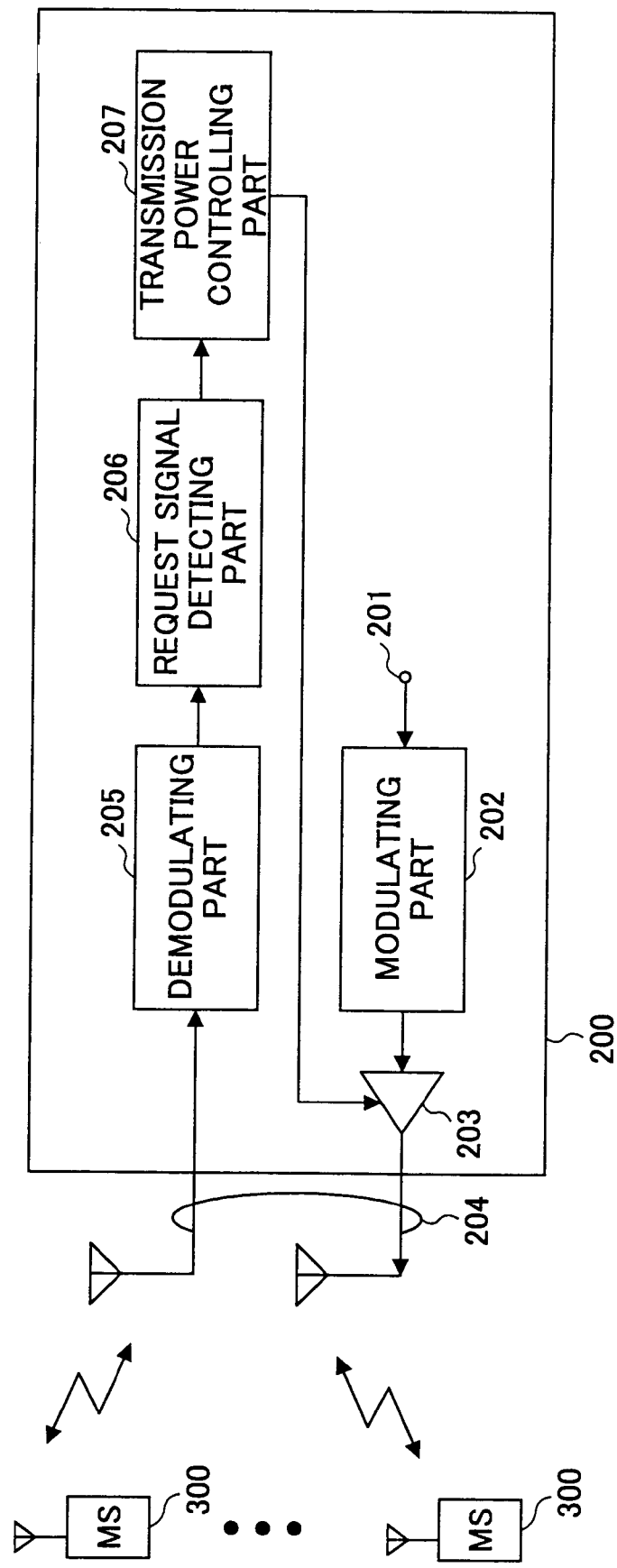
FIG. 2 is a schematic of a base station according to a first embodiment of the present invention.
Figure 3:
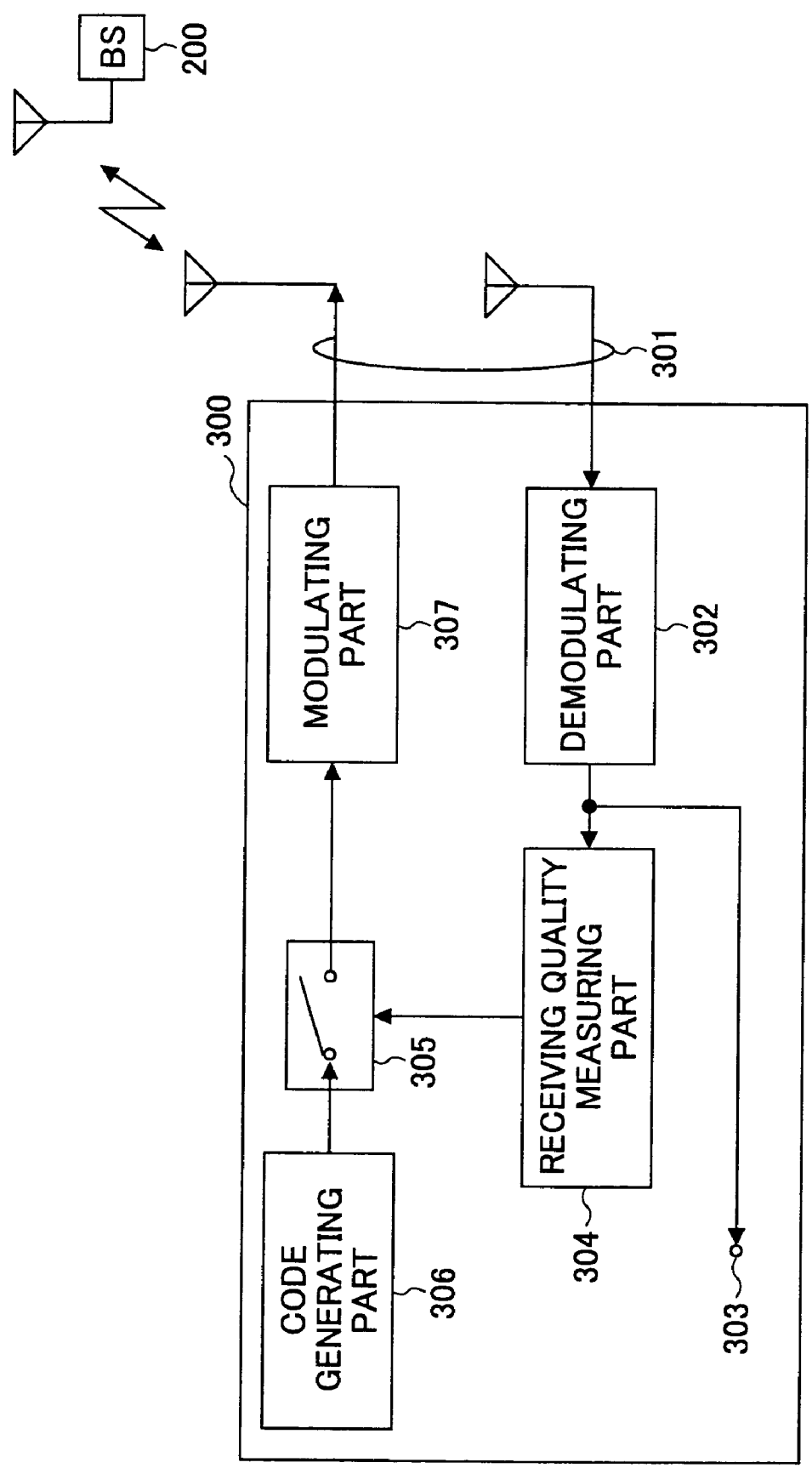
FIG. 3 is a schematic of a mobile station according to the first embodiment of the present invention.

The method for controlling the transmission power according to the first embodiment of the present invention is now described with reference to FIGS. 2 through 4. In this embodiment, the spreading code assigned separately for each multi-point transmission group is used as the request signal transmitted from the mobile station to the base station in the transmission power control, and the increase or decrease request is identified by transmitting or not transmitting the request signal.

First, the configuration and operation of the mobile station and the base station according to this embodiment are described with reference to FIGS. 2 and 3. FIG. 2 is the schematic of the multi-point transmitting base station in the CDMA radio communication system according to this embodiment, and FIG. 3 is the schematic of the mobile station targeted for the multi-point transmission in the CDMA radio communication system according to this embodiment. In both figures, only portions that are necessary for illustrating the present invention are outlined, and showing and detailing known configurations or functions are omitted.

In the base station 200, a multi-point transmitted signal is input from a signal input terminal 201 and modulated at a modulating part 202. This modulation is a so-called narrow-band modulation such as QPSK and 16 QAM. A modulated signal to be transmitted, of which the transmission power is controlled by a variable transmission power amplifier 203, is then transmitted via an antenna 204 to the plurality of target mobile stations 300 of the multi-point transmission at a time. The transmission power control by the variable transmission power amplifier 203 is performed as directed by a later-mentioned transmission power controlling part 207.

In each mobile station 300, the multi-point transmitted signal from the base station 200, which is received by an antenna 301, is demodulated by a demodulating part 302, and then output to a signal output terminal 303 and a receiving quality measuring part 304.

A demodulated signal, of which the receiving quality is measured by the receiving quality measuring part 304, is then determined whether to represent the increase or decrease request of the transmission power to the base station by comparing the result of such measurement with a predetermined threshold.

Here, the receiving quality may be determined using any parameters. For example, receiving power, carrier power to noise power ratio (C/N), signal power to noise power ratio (S/N), carrier power to sum of interference power and noise power (C/(I+N)), signal power to sum of interference power and noise power (S/(I+N)), bit error rate (BER), likelihood obtained in error correction decoding, and any combination of these may be used.

The receiving quality measuring part 304 outputs a transmission power control signal representing the increase or decrease request to a switch 305 on the basis of the above determination. The switch 305 is closed when the transmission power control signal input represents the increase request, while it is opened when it represents the decrease request.

A code generating part 306 keeps generating a predetermined single code sequence. Therefore, only when the transmission power control signal representing the increase request is input to the switch 305, the predetermined code sequence is then output to the modulating part 307. Here, the predetermined single code sequence is the code sequence that is assigned separately for each multi-point transmission group and hence that is unique to the group.

The request signal, which is the predetermined single code sequence and is input to the modulating part 307, is moderated, and then transmitted to the base station 200 via the antenna 301. This modulation is also narrow-band modulation.

Figure 1:
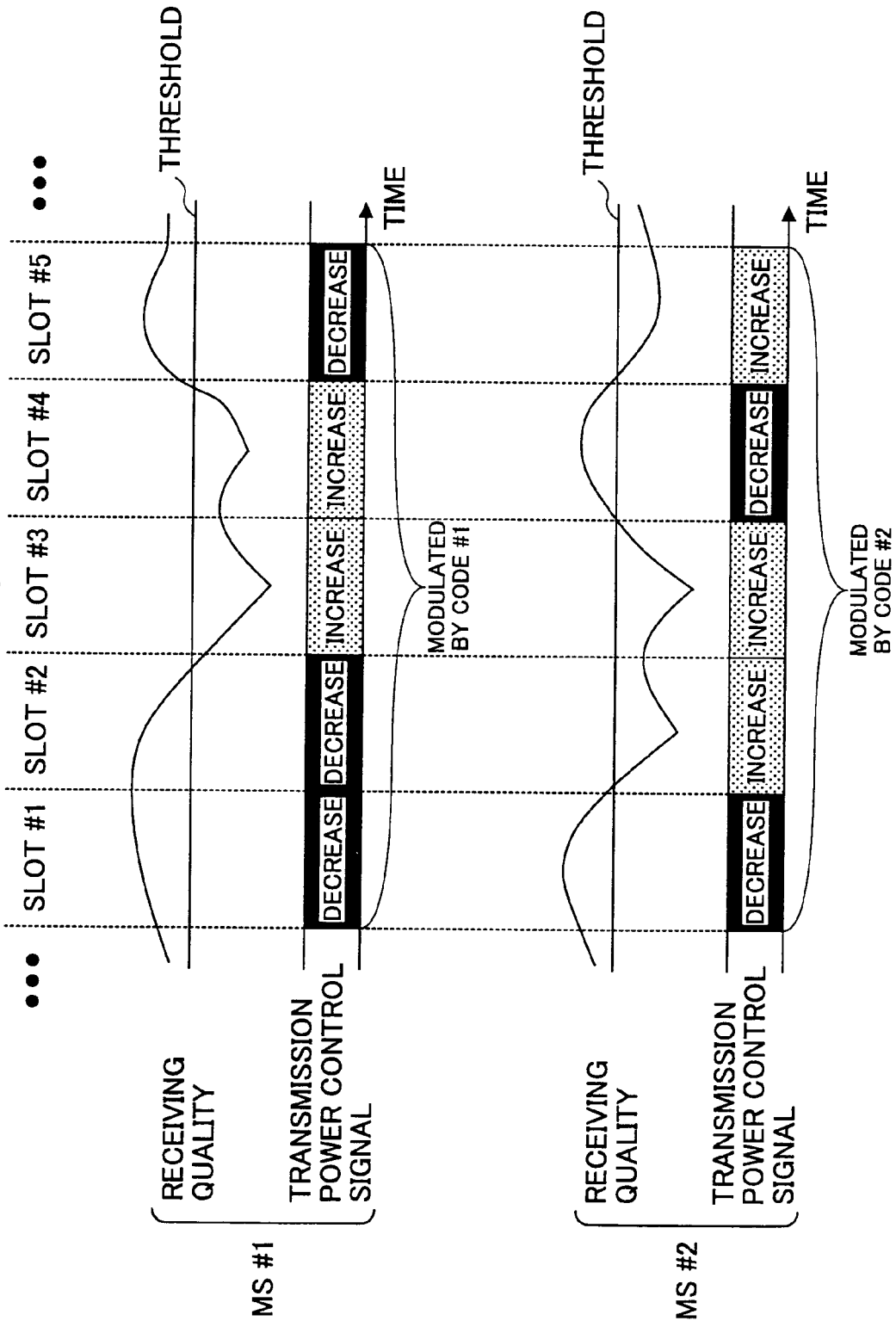
FIG. 1 is a diagram showing a state of the conventional transmission power control.
Figure 4:
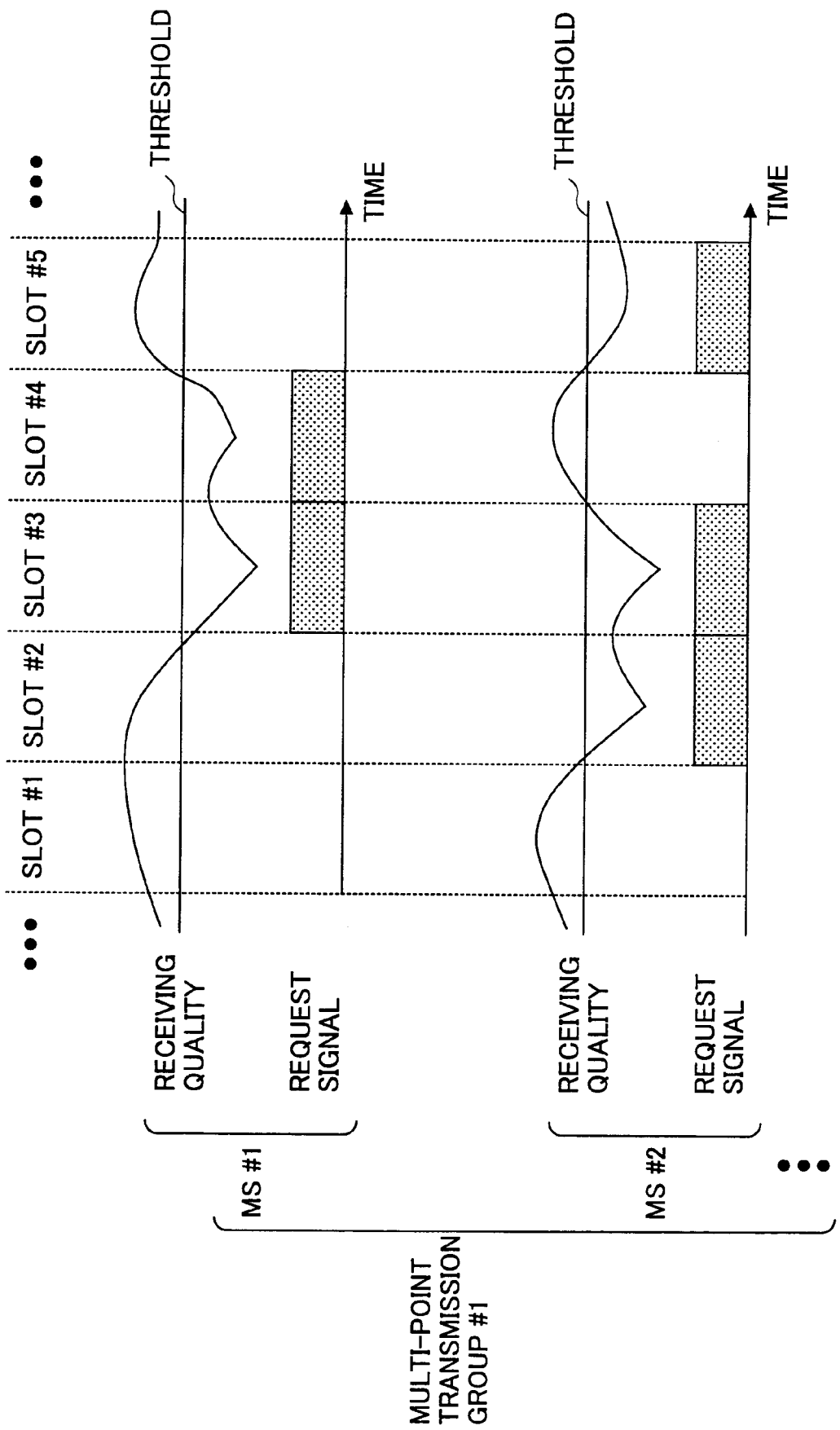
FIG. 4 is a diagram showing a state of transmission power control according to the first embodiment of the present invention.

An example of the request signal is shown in FIG. 4. FIG. 4 is based on the same transmission path condition as one shown in FIG. 1. As shown, in each mobile station, the request signal is transmitted only when the receiving quality is lower than the predetermined threshold and hence the mobile station requests the base station to increase the transmission power.

On the other hand, in the base station 200, the request signal in the transmission power control from the multi-point transmission target mobile station 300, which is received by the antenna 204, is demodulated by a demodulation part 205 and is output to a request signal detecting part 206.

The request signal detecting part 206 compares a value of the received electric power of the demodulated signal with a predetermined threshold. Since the request signal from the multi-point transmission target mobile station 300 is, as described above, transmitted to the base station only when the mobile station requests to increase the transmission power, it is determined that there are some mobile stations that transmit the request signal when the value exceeds the above threshold and that there is no mobile station that transmits the request signal when it does not exceed.

A result of the determination whether the request signal is detected in the request signal detecting part 206 is output to the transmission power controlling part 207. When the request signal is detected, the transmission power controlling part 207 directs the variable transmission power amplifier 203 to increase the transmission power of a multi-point transmission signal for the benefit of the mobile station that is one of the multi-point transmission target mobile stations and of which the receiving quality is not good. When the request signal is not detected, it is considered that all multi-point transmission target mobile stations receive the multi-point transmission signal with good enough receiving quality, and the transmission power controlling part 207 directs the variable transmission power amplifier 203 to decrease the transmission power. Here, the amount of control to decrease or increase one time may be any value.

Thus, according to this embodiment, in the transmission power control in the multi-point transmission, the increase or decrease request is provided from the mobile station to the base station by transmitting or not transmitting the predetermined code sequence assigned separately for each multi-point transmission group. Therefore, when there are some mobile stations in the multi-point transmission group of which the receiving quality is not good, the transmission power of the multi-point transmission signal can be controlled, and the increase of interference in the uplink can be prevented when the number of the mobile stations increases.

Here, in this embodiment, assuming that the code sequence output from the code generating part 306 is a code sequence that consists of sequential "1"s, a detection method that uses electric power measurement with unmodulated signals can be utilized in the base station 300. In other words, the above-mentioned code sequence is not limited to the spreading code, and may be a signal that consists of a predetermined bit sequences.

Also, in this embodiment, the above-mentioned code sequence, which is transmitted as the request signal, may be transmitted after it is spread with another spreading code, as well as in the usual CDMA communication. In other words, this embodiment can be directly applied to the existing CDMA communication system.

Furthermore, since it is not required for this embodiment to perform the spreading process, this embodiment can be also applied to communication systems adapted for TDMA and FDMA methods.

Figure 5:
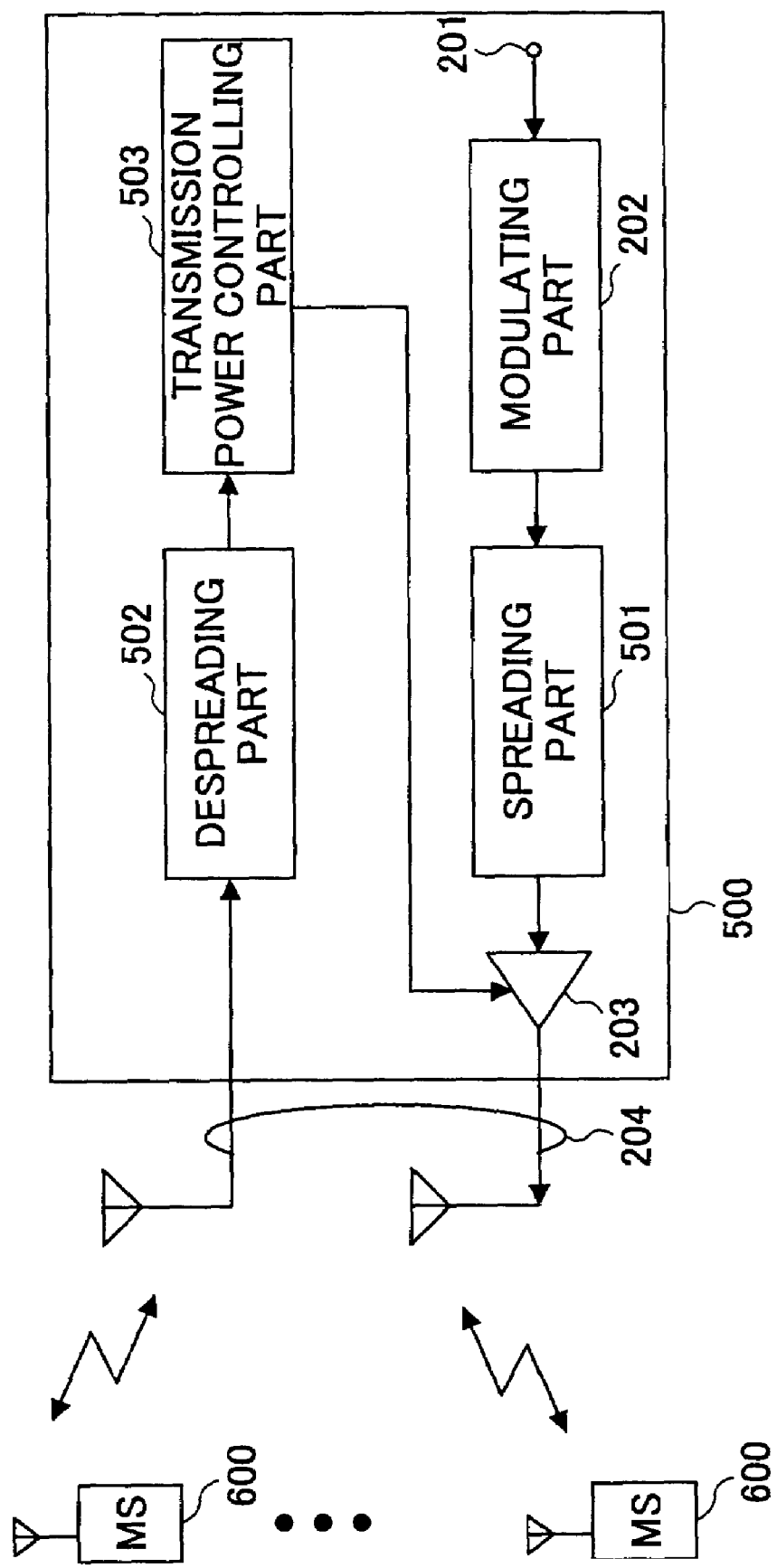
FIG. 5 is a schematic of a base station according to a second embodiment of the present invention.
Figure 6:
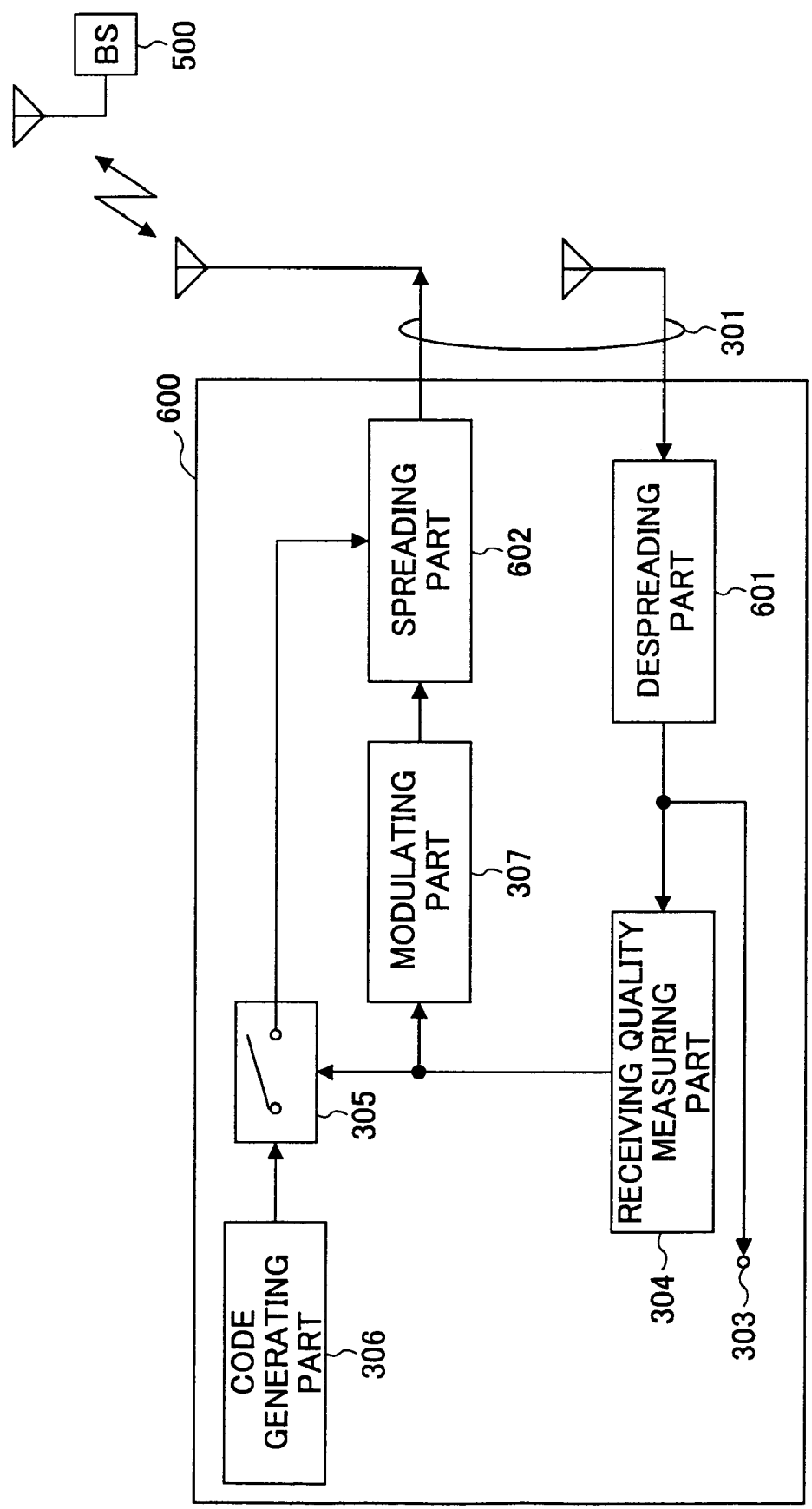
FIG. 6 is a schematic of a mobile station according to the second embodiment of the present invention.

The transmission power controlling method according to the second embodiment of the present invention is now described with reference to FIGS. 5 through 7. In this embodiment, the increase or decrease request for transmission power to the base station is identified by spreading or not spreading the transmission power control signal transmitted to the base station from the mobile station in the transmission power control with the spreading code assigned separately for each multi-point transmission group.

First, the configuration and operation of the base station and the mobile station according to this embodiment are described with reference to FIGS. 5 and 6, respectively. FIG. 5 is the schematic of the multi-point transmitting base station in the CDMA radio communication system according to this embodiment, and FIG. 6 is the schematic of the multi-point transmission target mobile station in the CDMA radio communication system according to this embodiment. In both figures, only portions that are necessary for illustrating the present invention are outlined, and showing and detailing known configurations or functions are omitted. Also, the same component as one in the already described embodiment has a consistent reference number, and the detailed description of it is omitted.

In the base station 500, a spreading part 501 spreads a modulated multi-point transmission signal with the spreading code assigned separately for each multi-point transmission group.

In each mobile station 600, a despreading part 601 despreads the received multi-point transmission signal. And, the transmission power control signal modulated by the modulating part 307 is input to a spreading part 602, while the code sequence output by the code generating part 306 is also input thereto only when that transmission power control signal represents the increase request of the transmission power.

If the code sequence is input, the spreading part 602 transmits the transmission power control signal to the base station 500 after spreading it, while, if the code sequence is not input, the spreading part 602 transmits the transmission power control signal to the base station 500 without spreading.

Figure 7:
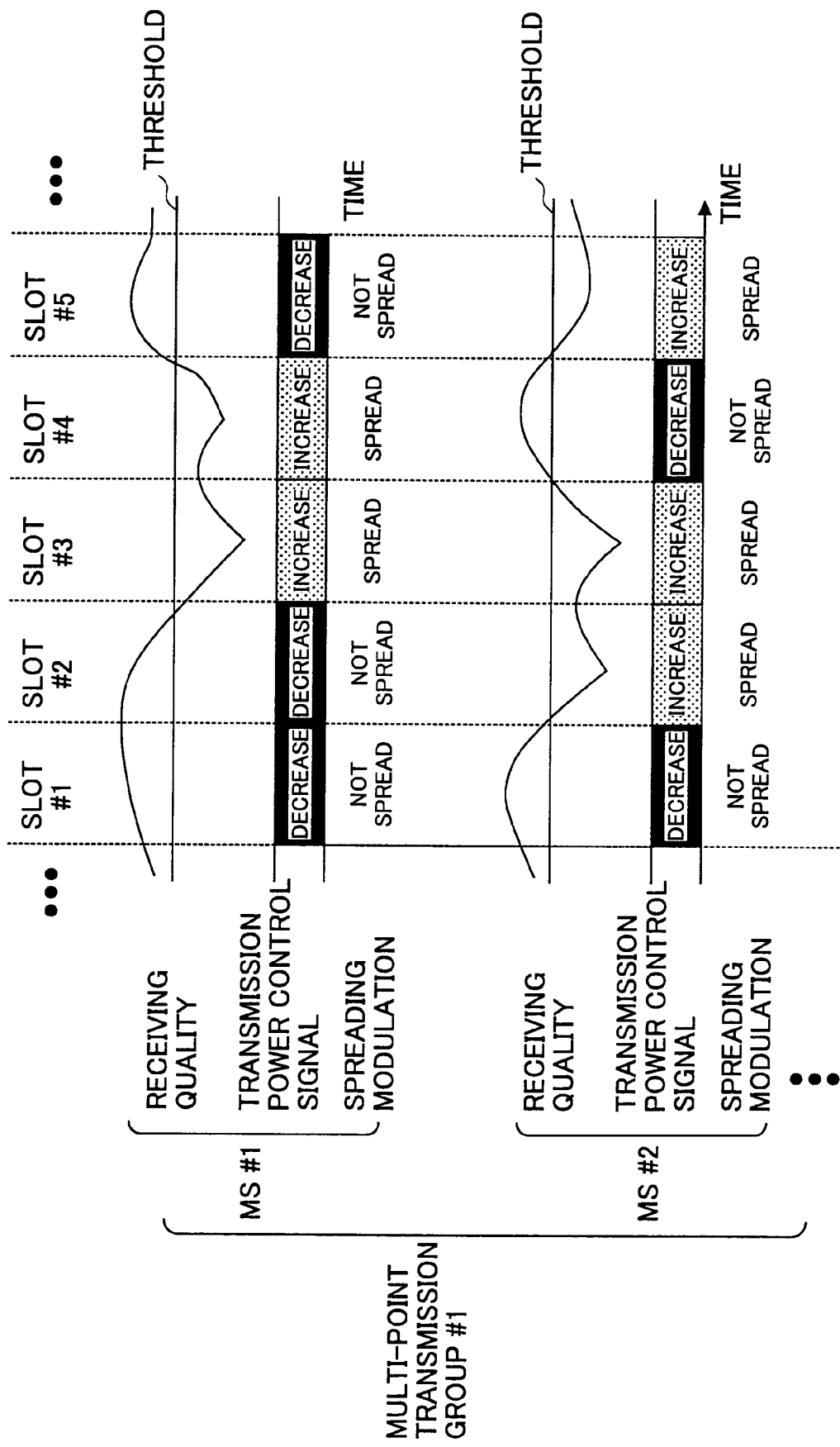
FIG. 7 is a diagram showing a state of transmission power control according to the second embodiment of the present invention.

An example of the above-mentioned transmission power control signal is shown in FIG. 7. FIG. 7 is based on the same transmission path condition as one shown in FIG. 1. As shown, in each mobile station, the transmission power control signal is spread with the code sequence assigned separately for each multi-point transmission group only when the receiving quality is lower than the predetermined threshold and hence the mobile station requests the base station to increase the transmission power.

In the base station 500, the transmission power control signal received from the multi-point transmission target mobile station 600 is despread by the despreading part 502 and is correlated with the code sequence assigned for that multi-point transmission group.

In the conventional CDMA radio communication system, a transmitting mobile station is identified by the spreading code. However, in this embodiment, since the mobile stations belonging to the same multi-point transmission group use the same code sequence for the sreading process of the transmission power control signal, the transmission power control signals for one group are received in a combined form.

Since the despreading process in the despreading part 502 is to perform a correlation process on the combined signal, a peak is detected in the despreading process to the combined signal if there is even one mobile station that requests to increase the transmission power in that multi-point transmission group.

A result of the determination whether the peak is detected or not in the despreading part 502 is output to the transmission power controlling part 503. When the peak is detected, the transmission power controlling part 207 directs the variable transmission power amplifier 203 to increase the transmission power of the multi-point transmission signal for the benefit of the mobile station that is one of the multi-point transmission target mobile stations and of which the receiving quality is not good. When the peak is not detected, it is considered that all multi-point transmission target mobile stations receive a multi-point transmission signal with good enough receiving quality, and directs the variable transmission power amplifier 203 to decrease the transmission power. Here, the amount of control to decrease or increase one time may be any value.

Thus, according to this embodiment, in the transmission power control in the multi-point transmission, the increase or decrease request is provided from the mobile station to the base station by spreading or not spreading with the predetermined code sequence assigned separately for each multi-point transmission group. Therefore, when there are some mobile stations in the multi-point transmission group of which the receiving quality is not good, the transmission power of the multi-point transmission signal can be controlled, and the increase of interferences in the uplink can be prevented when the number of the mobile stations increases.

The transmission power controlling method according to the third embodiment of the present invention is now described with reference to FIGS. 8 through 13. This embodiment utilizes basically the same configuration and operation as ones according to the first embodiment, and provides not only the increase or decrease request of the transmission power but also the request amount of control from each mobile station to the base station by assigning a plurality of predetermined code sequences separately for each multi-point transmission group and utilizing the distinctiveness among the set of code sequences.

Figure 8:
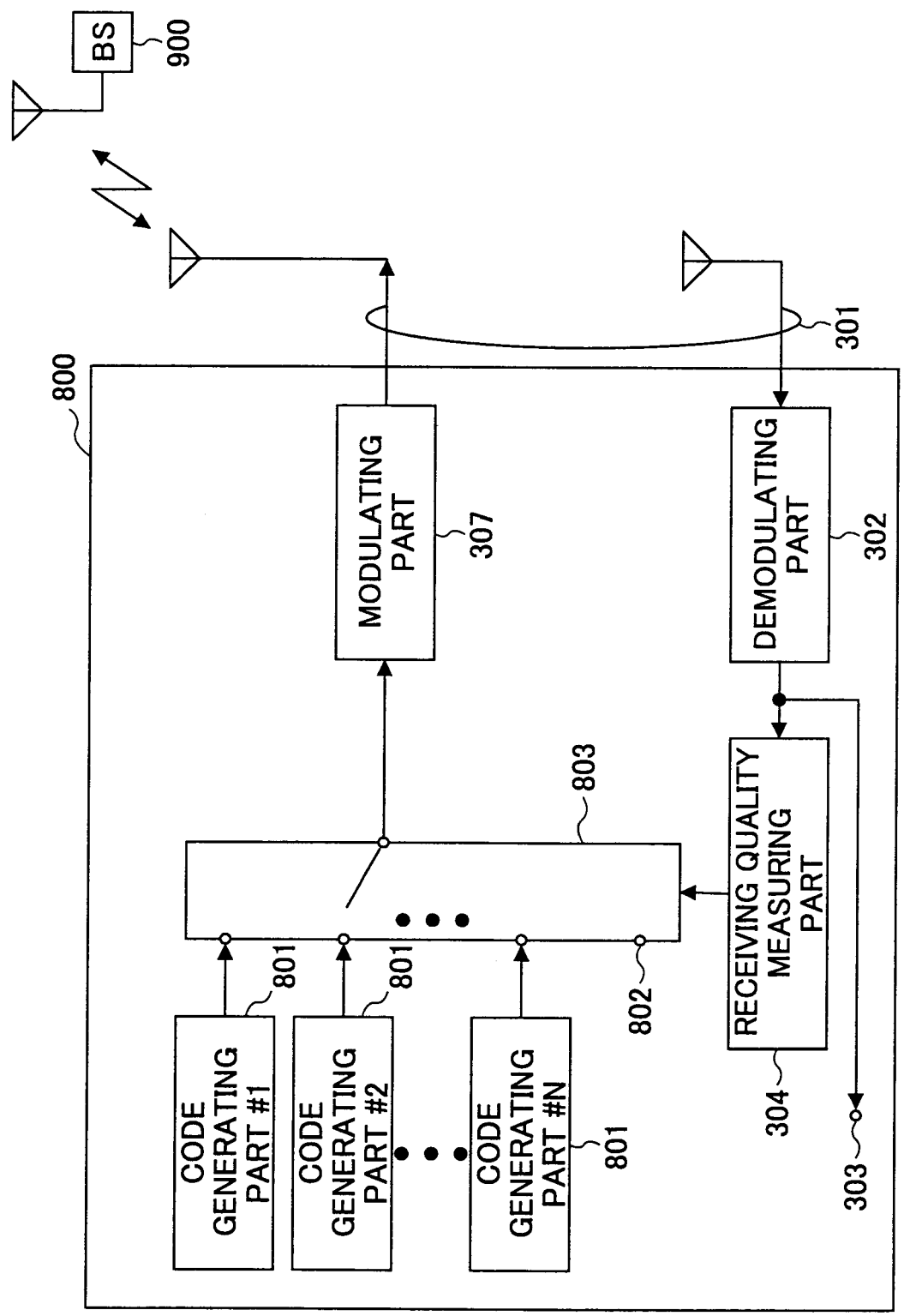
FIG. 8 is a schematic of a mobile station according to a third embodiment of the present invention.
Figure 9:
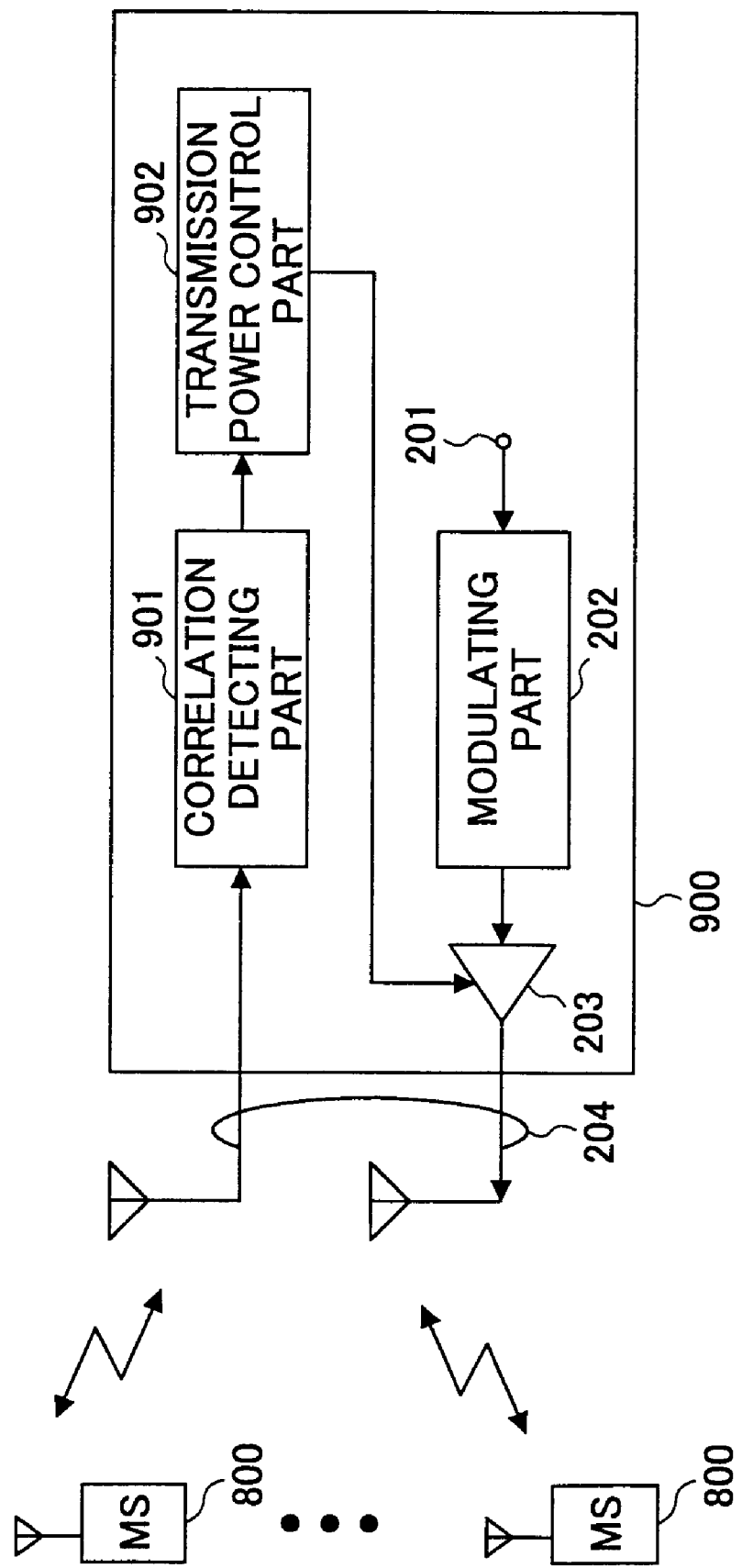
FIG. 9 is a schematic of a base station according to the third embodiment of the present invention.
Figure 10:
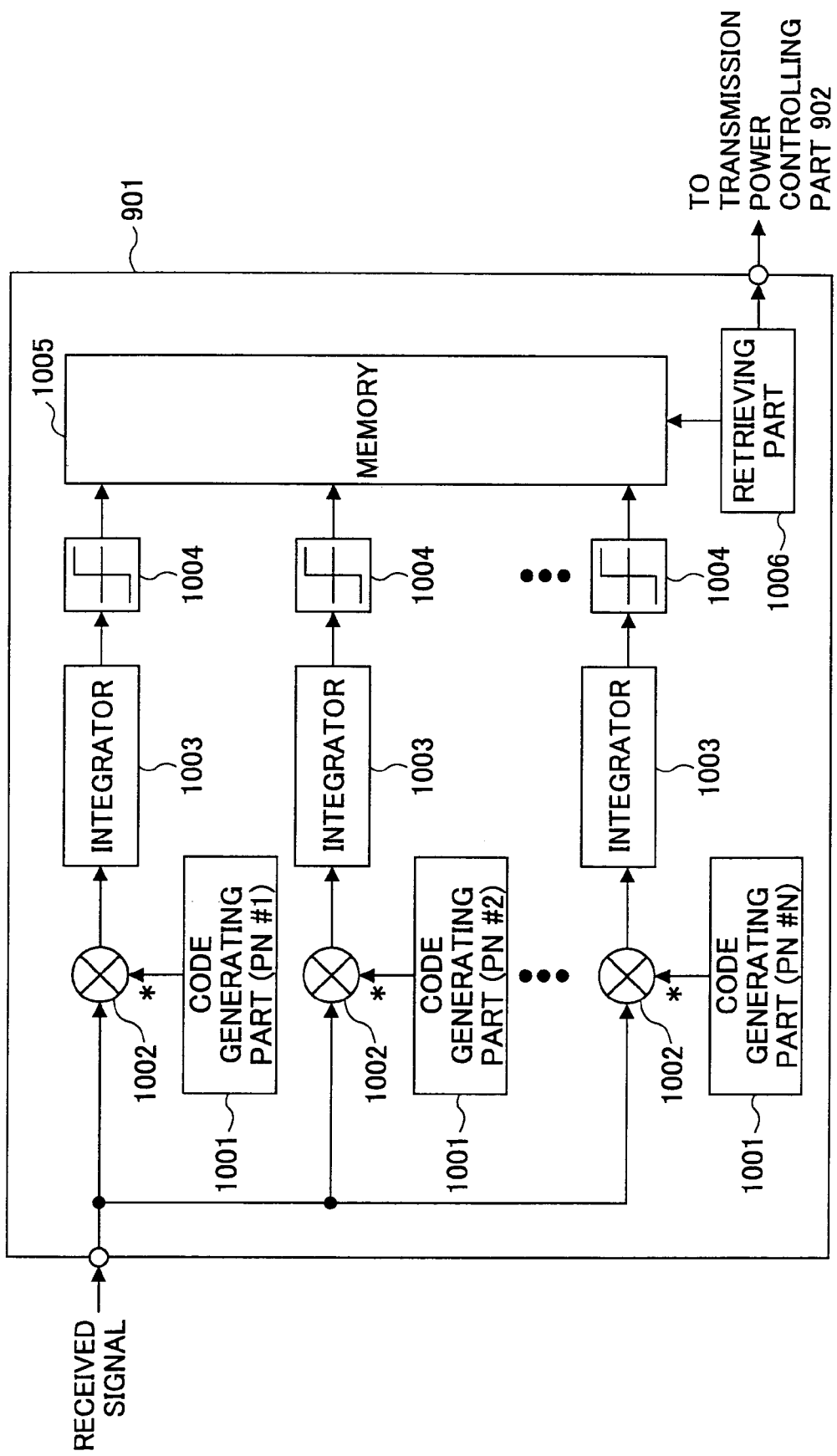
FIG. 10 is a schematic of a correlation detecting part of the base station according to the third embodiment of the present invention.

First, the configuration and operation of the mobile station and the base station according to this embodiment are described with reference to FIGS. 8 through 10. FIG. 8 is the schematic of the multi-point transmission target mobile station 800 in the CDMA radio communication system according to this embodiment, FIG. 9 is the schematic of the multi-point transmitting base station 900 in the CDMA radio communication system according to this embodiment, and FIG. 10 is the schematic of the correlation detecting part 901 of the base station according to this embodiment. In each figure, only portions that are necessary for illustrating the present invention are outlined, and showing and detailing known configurations or functions are omitted. Also, the same component as one in the already described embodiments has a consistent reference number, and the detailed description of it is omitted.

As shown, the mobile station 800 according to this embodiment has a plurality of (here, N individual) code generating parts 801, where each of the code generating parts 801 always keeps outputting differentiable PN codes (PN #1 to PN #N) Each of the N individual PN codes is associated with a different value of control of the transmission power in advance.

The set of PN codes is here assigned for different multi-point transmission groups. For example, in the case that the number of available PN codes is 256 and that there are four multi-point transmission groups, the 1st through 64th PN codes are assigned to the 1st group, the 65th through 128th PN codes are assigned to the 2nd group, the 129th through 192nd PN codes are assigned to the 3rd group, and the 193rd through 256th PN codes are assigned to the 4th group.

A switch 803 is an (N+1) selector. The switch 803 has N individual input terminals, one for each code generating part 801, and one connection-less terminal 802. The terminals of the switch 803 are selected in accordance with the value of control that is represented by the transmission power control signal input from the receiving quality measuring part 304.

An example of the operation standard of the switch 803 is shown in FIG. 11. It is here assumed that eight kinds of transmission power control signals (000 to 111) are input to the switch 803 from the receiving quality measuring part 304 and that five code generating parts 801 are provided.

As shown, a different transmission power control signal is output from the receiving quality measuring part 304 in accordance with the value of control (dB unit) requested to the base station on the basis of the receiving quality. It is here assumed that the request value of control is, as shown, −2 dB to +5 dB.

When the transmission power control signal is input, the switch 803 performs one of operations, which are in advance associated with the transmission power control signals, in accordance with that input signal. In this example, when the request value of control is equal to or lower than ±0 dB (that is, when it is not an increase request) the connection-less terminal 802 is connected (meaning connection-off) and hence the request signal is not output, when +1 dB is requested, the code sequence PN #1 is used for the request signal, subsequently, in turn, PN #2 for +2 dB, PN #3 for +3 dB, PN #4 for +4 dB, and PN #5 for +5 dB are respectively output to the modulating part 307 and used for the request signal to the base station.

On the other hand, the base station 900 receives the request signal that is any one code sequence in the predetermined set of the code sequences transmitted from each multi-point transmission target mobile station 800, and calculates correlation between the receiving signal and the above-mentioned predetermined set of the code sequences in the correlation detecting part 901.

The configuration and operation of the above-mentioned correlation detecting part 901 is now described with reference to FIG. 10. FIG. 10 is the schematic of the correlation detecting part 901 according to this embodiment. N individual code generating parts 1001, each of which employs the same configuration as the code generating part 801 of the mobile station side, are provided and output PN codes PN #1 to PN #N, respectively. Each multiplier 1002 calculates complex multiplication between the received signal and complex conjugate of each PN code sequence.

The real part of the complex vector signal obtained by the multiplier 1002 is integrated by each integrator 1003. The resultant value of the integration is determined whether to be equal to or higher than a predetermined threshold or not by the threshold deciding part 1004, and the result of this decision is recorded in a memory 1005. A result of determination whether there are any mobile stations that request to increase the transmission power for each amount of control associated with the code sequence is thus accumulated in the memory 1005.

A retrieving part 1006 makes reference to the determination result accumulated in the memory 1005 to retrieve the largest amount of control among the amounts of control requested by the mobile stations and then to output a PN code number associated with the maximum amount of control to the transmission power controlling part 902.

The transmission power controlling part 902 makes reference to a pre-stored relationship (an example of which is shown in FIG. 11) between the PN code and the amount of control (increase) of the transmission power with input PN code number, and then directs the variable transmission power amplifier 203 to increase the transmission power in accordance with the amount of control of the transmission power of that PN code.

Also, when no PN code sequence number is input from the correlation detecting part 901, the transmission power controlling part 902 considers that all multi-point transmission target mobile stations belonging to that multi-point transmission group receive the multi-point transmission signal with good enough receiving quality, and directs the variable transmission power amplifier 203 to decrease the transmission power.

Figure 12:
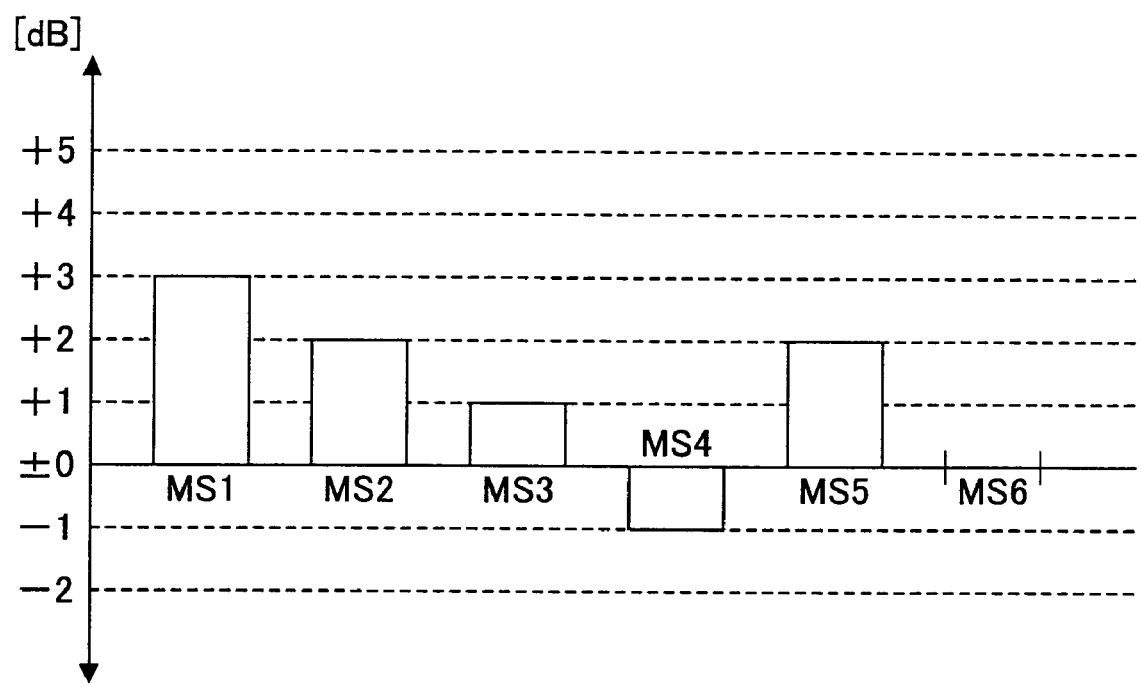
FIG. 12 is a diagram showing an example of the amount of control requested from a mobile station belonging to the multi-point transmission group.

This is now described more specifically with reference to an example of the multi-point transmission group shown in FIG. 12. As shown, it is assumed that there is the multi-point transmission group consisting of six mobile stations: MS1 through MS6, and that contents of the transmission power control requested to the base station determined in each mobile station are MS1: +3 dB, MS2: +2 dB, MS3: +1 dB, MS4: −1 dB, MS5: +2 dB, and MS6: ±0 dB, respectively.

In the case of the above example, assuming that the PN code sequences transmitted from each mobile station to the base station is based on the relationship shown in FIG. 11, PN #3 is transmitted from MS1, PN #2 is transmitted from MS2 and MS5, PN #1 is transmitted from MS3, and no PN code sequence is transmitted from MS4 or MS6.

Then, since, in the example shown in FIG. 12, +3 dB from MS1 is the largest request value of control in the amounts of control requested from each mobile station and accumulated in the memory 1005, the transmission power controlling part 902 directs the variable transmission power amplifier 203 to increase the transmission power of the that multi-point transmission signal by 3 dB.

Thus, according to this embodiment, in the transmission power control in the multi-point transmission, the increase or decrease request is provided from the mobile station to the base station by transmitting or not transmitting the predetermined code sequence assigned separately for each multi-point transmission group, and also the request amount of control is provided as well utilizing the distinctiveness among the code sequences used. Therefore, increase of interferences in the uplink can be prevented when the number of the mobile stations increases, and the transmission power can be quickly and flexibly controlled in accordance with the transmission path condition.

Here, in the above description, the case is described that the code sequence is transmitted only when the contents of control requested from the mobile station to the base station indicates the increase request. This results so that, when the request to keep or decrease the transmission power is desired, processing can be advantageously simplified, in a view that all mobile stations already receive with good enough receiving quality. However, of course, the code sequences can be assigned separately for each amount of control in the request to keep or decrease to provide the base station of it. In this case, since quick control can be also achieved for decreasing, resource efficiency can improve.

Also, in the description of this embodiment, the PN code is just an example of the code sequence having distinctiveness, and other spreading code having the distinctiveness such as orthogonal Gold code, or error correcting codes such as BCH code, RS code, or M-array code may be used.

Furthermore, in this embodiment, the code sequence, which is transmitted as the request signal, may be spread with another spreading code, as well as in the usual CDMA communication.

The transmission power controlling method according to the fourth embodiment of the present invention is now described with reference to FIG. 13. This embodiment utilizes basically the same configuration and operation as ones according to the second embodiment, and provides not only the increase or decrease request of the transmission power but also the request amount of control from each mobile station to the base station by assigning a plurality of predetermined code sequences separately for each multi-point transmission group and utilizing the distinctiveness among the set of the code sequences as well as the third embodiment.

Here, since the base station according to this embodiment is identical to the base station 900 (FIG. 9) according to the third embodiment, showing and detailing of it are omitted.

Figure 13:
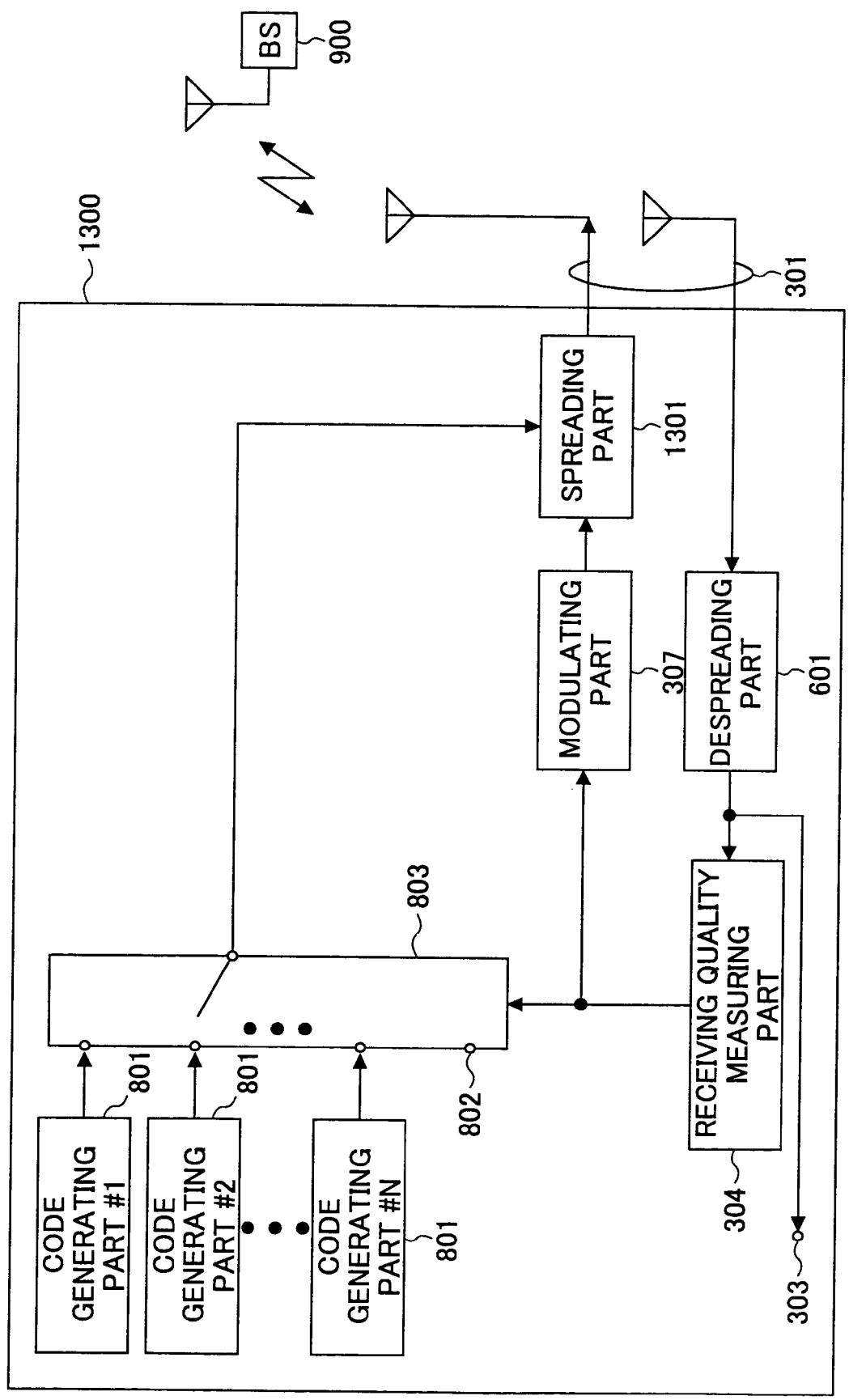
FIG. 13 is a schematic of a mobile station according to a fourth embodiment of the present invention.

FIG. 13 is the schematic of the multi-point transmission target mobile station 1300 in the CDMA radio communication system according to this embodiment. In this figure, only portions that are necessary for illustrating the present invention are outlined, and showing and detailing known configurations or functions are omitted. Also, the same component as one in the already described embodiments has a consistent reference number, and the detailed description of it is omitted.

In the mobile station 1300, as well as the third embodiment, the PN code sequence in accordance with the request value of control is input from the switch 803 to a spreading part 1301. The spreading part 1301 spreads the transmission power control signal modulated by the modulating part 307 with the code sequence output from the switch 803. When the transmission power control requested to the base station is not the increase request, the switch 803 turns its input terminal to the connection-less terminal 802, and hence no code sequence is input to the spreading part 1301, therefore, the transmission power control signal is then transmitted to the base station without spreading.

In the base station, the same processing as one in the base station 900 according to the third embodiment is performed. It is then determined whether there are any mobile stations transmitting the increase request and how large the request amount of control is, and the transmission power is increased in accordance with the request amount of control from the mobile station having the worst receiving condition.

Thus, according to this embodiment, in the transmission power control in the multi-point transmission, the increase or decrease request is provided from the mobile station to the base station by spreading or not spreading with the predetermined code sequence assigned separately for each multi-point transmission group, and also the request amount of control is provided as well utilizing the distinctiveness among the code sequences used. Therefore, increase of interferences in the uplink can be prevented when the number of the mobile stations increases, and the transmission power can be quickly and flexibly controlled in accordance with the transmission path condition.

Here, in the above description, the case is described that the transmission power control signal spread with the code sequence is transmitted only when the contents of control requested from the mobile station to the base station indicates the increase request. This results so that, when the request to keep or decrease the transmission power is desired, processing can be advantageously simplified, in a view that all mobile stations already receive with good enough receiving quality. However, of course, the code sequences can be assigned separately for each amount of control in the request to keep or decrease to provide the base station of it. In this case, since quick control can be also achieved for decreasing, resource efficiency can improve.

Also, in the description of this embodiment, the PN code is just an example of the code sequence having the distinctiveness, and other spreading code having the distinctiveness such as orthogonal Gold code, or error correcting codes such as BCH code, RS code, or M-array code may be used.

The transmission power controlling method according to the fifth embodiment of the present invention is now described with reference to FIGS. 14 and 15. This embodiment utilizes approximately the same configuration and operation as ones according to the fourth embodiment, however, the mobile station transmits a predetermined signal, instead of the transmission power control signal, to the base station after spreading it with a selected code sequence. Here, only portions that are necessary for illustrating the present invention are outlined, and showing and detailing known configurations or functions are omitted. Also, the same component as one in the already described embodiments has a consistent reference number, and the detailed description of it is omitted.

Figure 14:
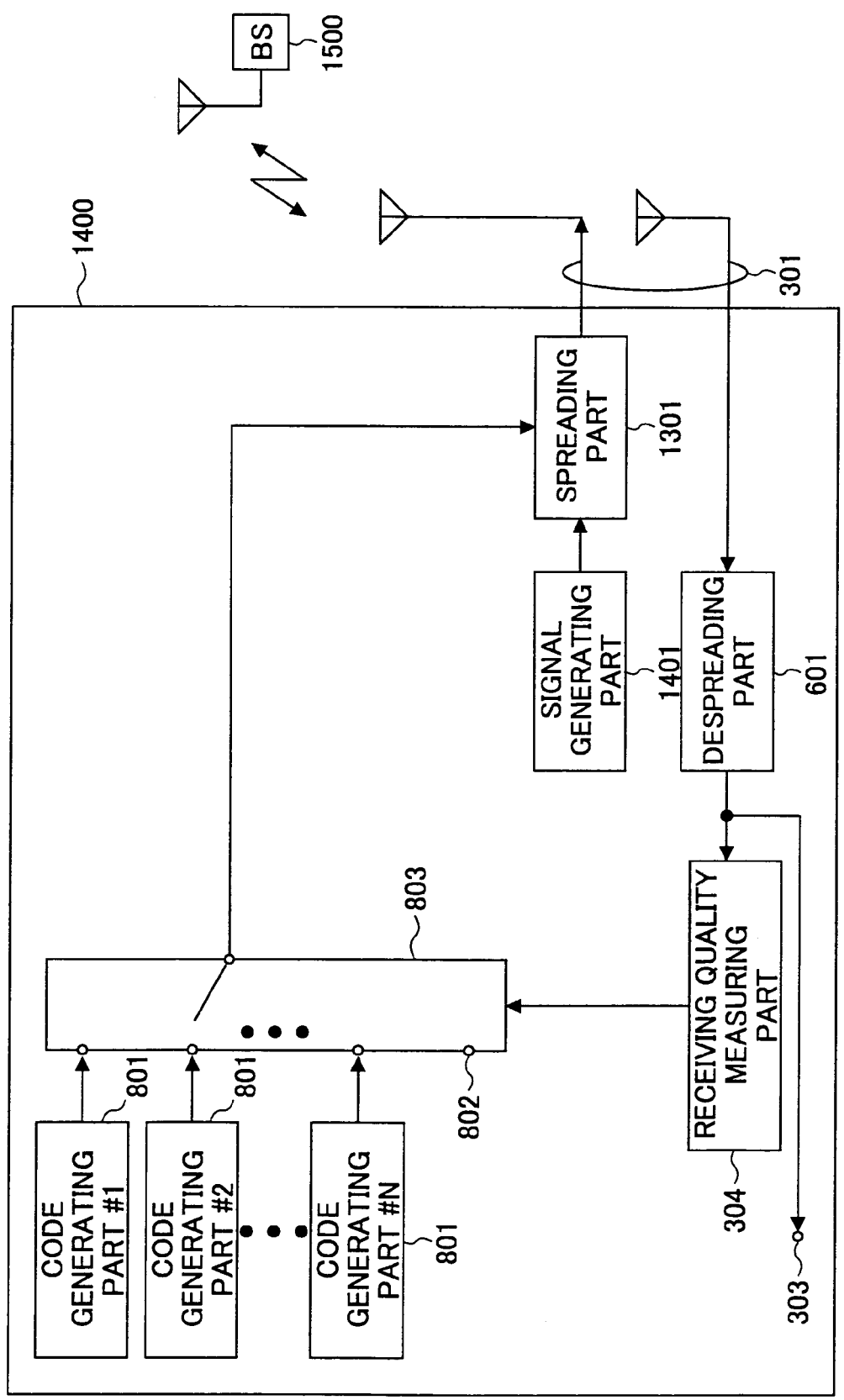
FIG. 14 is a schematic of a mobile station according to a fifth embodiment of the present invention.

FIG. 14 is the schematic of the mobile station 1400 according to this embodiment. A signal generating part 1401 always keeps outputting a predetermined bit sequence. This bit sequence is spread with the code sequence output from the switch 803 by the spreading part 1301, and is then transmitted to the base station 1500.

Figure 15:
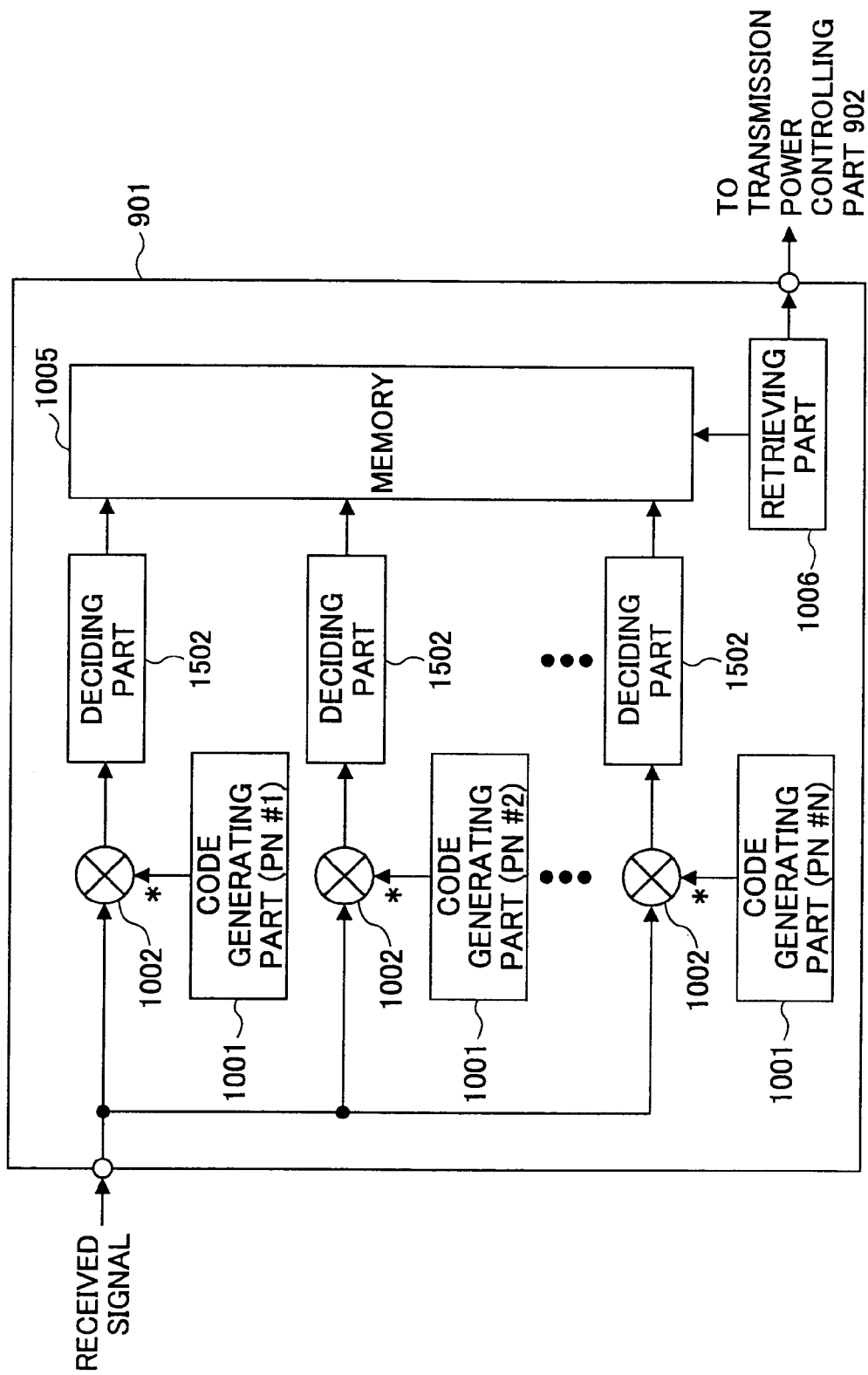
FIG. 15 is a schematic of a correlation detecting part of a base station according to the fifth embodiment of the present invention.

FIG. 15 is the schematic of a correlation detecting part 1501 of the base station 1500 according to this embodiment. Each of deciding parts 1502 decides whether the received signal that is despread with each code sequence is the above predetermined bit sequence output from the signal generating part 1401. This decision process is similar to a usual data demodulation. Then, this decision result is recorded in the memory 1005.

Detailed description of the transmission power control processes other than those above is omitted since they are similar to the processes according to the fourth embodiment. Here, any bit sequence may be used for the above predetermined bit sequence.

Thus, according to this embodiment, the predetermined single bit sequence is used for the request signal from the mobile station, and the base station can utilize the decision using the data demodulation instead of the decision using the predetermined threshold where its detection capability significantly depends on the setting of the threshold, and thereby it is determined whether that code sequence is used for spreading in the mobile station by double examination consisting of the correlation process and the bit decision. Therefore, more reliable and stable correlation detection can be achieved.

The transmission power controlling method according to the sixth embodiment of the present invention is now described with reference to FIG. 16. This embodiment utilizes basically similar configuration and operation to ones according to the third or fourth embodiment, however, the correlation detector in the base station is implemented by software.

The program processing to implement the correlation detector is now described with reference to the flow chart shown in FIG. 16. Here, the block diagram showing the configuration of the base station and the mobile station is omitted.

First, 0 is assigned to a variable n in S1601 where n is a variable representing the PN code number. In other words, in S1601, the 0th PN code is set as the initialized state. It is here assumed that the value of n is, like the example shown in FIG. 11, set such that it corresponds to the request value of control (dB unit)

A correlation value between the received signal and the 0th PN code is then calculated in S1602, where X (t) is time-series data of the received signal, Xn*(t) is a complex conjugate of the time-series data of the $n^{th}$ PN code, T is the length of the time-series data, and Γn is the correlation value between the received signal and the $n^{th}$ PN code.

It is then decided in S1603 whether the correlation value calculated in S1602 is equal to or higher than a predetermined threshold or not. If it is equal to or higher than the threshold, 1 is then assigned to a variable Sn, while, if it does not reach to the threshold, 0 is then assigned to Sn (S1605), where the variable Sn is a flag that becomes on when the correlation value Γ n between the received signal and the nth PN code exceeds the predetermined threshold.

The variable n is then incremented by one (S1606), and it is decided whether n reaches N (S1607). If it reaches, the process then proceeds to S1608, while, if it does not, the process then returns to S1602.

In S1608, (N−1) is assigned to the variable n, and the (N−1)th PN code is set. It is then decided whether the variable n is 1 or not (S1609). If Sn is not equal to 1 ("No" at S1609) n is then decremented one by one until it becomes 0 (S1610 and S1611) to find the value of n when Sn=1.

If it is decided that Sn=1 in S1609, the process then proceeds to S1613 and the transmission power is increased by n [dB] on the basis of the value of n at that time. Also, if n becomes 0 before it is decided that Sn=1 in S1609 ("Yes" at S1611), it is decided that the correlation value that exceeded the predetermined threshold is not obtained. In other words, it is determined that there is no mobile station that requests to increase the transmission power in that multi-point transmission group. Therefore, the transmission power of the multi-point transmission signal is decreased in S1612.

Thus, according to this embodiment, since the correlation detector can be implemented by software, the base station according to the present invention can have a simplified configuration.

The transmission power controlling method according to the seventh embodiment of the present invention is now described with reference to FIG. 17. This embodiment also has the correlation detector in the base station implemented by software like the sixth embodiment, however utilizes a different algorithm from one used in the processes of the sixth embodiment.

In the correlation detecting process according to the sixth embodiment, the transmission power of the multi-point transmission signal is controlled in accordance with the mobile station requesting the largest amount of increase of the transmission power, i.e. the transmission power is controlled such that the mobile station having the worse receiving quality can have good receiving quality.

On the other hand, in this embodiment, putting importance on the efficiency of the whole system, the transmission power is controlled in accordance with the amount of control that is requested by the most mobile stations in the amounts of control requested from the mobile stations. By the way, such control is not performed in the conventional system, since the conventional base station individually controls the transmission power for each mobile station.

The program processing to implement the correlation detector is now described with reference to the flow chart shown in FIG. 17. Here, detailed description of the variables and the processes used also in the process in FIG. 16 is omitted. Also, the block diagram showing the configuration of the base station and the mobile station is omitted.

Figure 16:
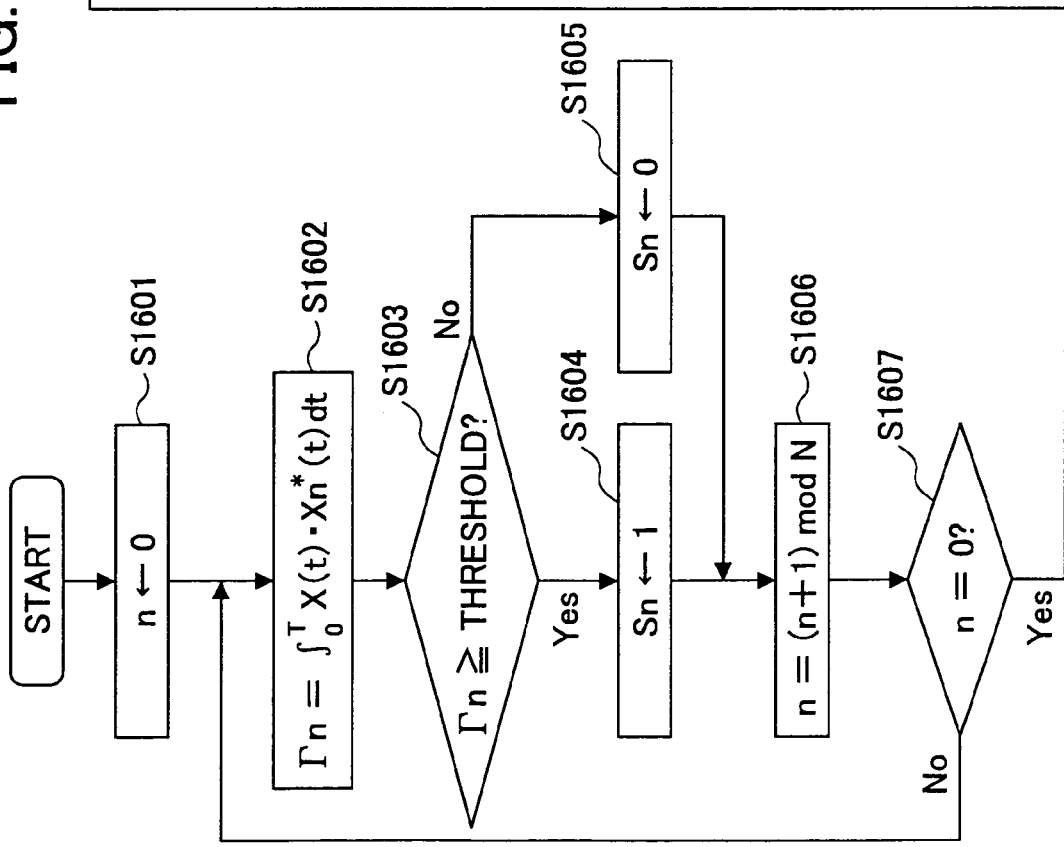
FIG. 16 is a flowchart showing a flow of a correlation detecting process according to the sixth embodiment of the present invention.

First, S1701 and S1702 are identical to S1601 and S1602 in FIG. 16. Γn is then assigned to the variable Sn in S1703.

Similarly, S1704 and S1705 are identical to S1604 and S1605 of FIG. 16. If n reaches N, the process proceeds to S1706.

Then, (N−1) and $S_{N-1}$ are assigned to $n_{max}$ and $Sn_{max}$ respectively in S1706, where $Sn_{max}$ represents the largest correlation value obtained by that time, and $n_{max}$ represents the value of n (i.e. the PN code number) when the largest correlation value is obtained.

It is then decided whether Sn at that time is larger than $Sn_{max}$ or not in S1707. If Sn at that time does not exceed the largest value $Sn_{max}$ obtained by that time ("No" at S1707), n is then decremented one by one until it becomes 0 (S1710 and S1711) to find the value of n when $Sn>Sn_{max}$.

If Sn is larger than $Sn_{max}$ ("Yes" at S1707) n and Sn at that time are assigned respectively to $n_{max}$ and $Sn_{max}$ as a new maximum value (S1708). Here, since the request signal or the transmission power control signal from the mobile stations that request the same amount of increase consists of the same PN code sequence or is spread with the same PN code sequence, the request signals from all the mobile stations that request the same amount of control are detected in a combined form upon being despread. Therefore, the more the mobile stations that request the same amount of control are, the larger correlation value is obtained. That is, the above comparison of magnitude of the correlation value means the comparison of count for each amount of control requested.

Then, if n becomes 0 ("Yes" at S1710) and it is determined that the comparison on Sn is completed for all n, it is decided whether $Sn_{max}$ at that time exceeds the predetermined threshold or not (S1711).

If $Sn_{max}$ exceeds the predetermined threshold ("Yes" at S1711), the transmission power is increased by n [dB] on the basis of the value of n at that time. For example, in the example shown in FIG. 12, since the mobile stations that request +2 dB of increase of the transmission power are the most, the correlation value on the second PN code sequence PN #2 becomes the largest and the transmission power is increased by +2 dB.

Also, if the maximum correlation value $Sn_{max}$ does not exceed the predetermined threshold in S1711 ("NO" at S1711), it is then determined that there is no mobile station that requests increase of the transmission power in that multi-point transmission group. Therefore, the transmission power of the multi-point transmission signal is decreased in S1712.

Thus, according to this embodiment, since the transmission power of the multi-point transmission signal is increased on the basis of the amount of control requested by the most mobile stations in the mobile stations belonging to the multi-point transmission group, the transmission power is not excessively increased in consequence of the reduced receiving quality of a particular mobile station, and the transmission power of the multi-point transmission signal can be controlled in view of the efficiency in the whole system.

As described above, according to the above first through seventh embodiments, in the transmission power control in the radio communication system adapted for the CDMA method, as for the target mobile station of the multi-point transmission, since the code sequence is not assigned separately for each mobile station but separately for each request signal or separately for each request amount of control, the possibility of increase of the interference in the uplink by increasing the number of the mobile stations can be reduced.

The invention claimed is:

1. A method for controlling transmission power in a radio communication system comprising a base station and a mobile station where the base station is able to perform multi-point transmission for transmitting a same signal to intended target mobile stations among a plurality of mobile stations located in a coverage area of the base station, wherein:

the mobile station targeted for the multi-point transmission provides the base station with an increase request or a decrease request of the transmission power by respectively transmitting or not transmitting a predetermined signal to the base station;

a set of the mobile stations consisting of the multi-point transmission target mobile stations to which the base station transmits the same signal is referred to as a multi-point transmission group; and the predetermined signal is different for each multi-point transmission group.

2. The method for controlling the transmission power as claimed in claim 1, wherein:

the multi-point transmission target mobile station provides the base station of the increase request or the decrease request of the transmission power by respectively transmitting or not transmitting a predetermined code sequence to the base station.

3. The method for controlling the transmission power as claimed in claim 2, wherein:

the multi-point transmission target mobile station determines contents of the transmission power control to be requested to the base station on the basis of receiving quality of received signal from the base station, and transmits the predetermined code sequence to the base station when the contents of the transmission power control is determined to be the increase request of the transmission power to the base station; and the base station calculates correlation between the signal received from the multi-point transmission target mobile station and the predetermined code sequence pre-stored, and increases the transmission power to the multi-point transmission target mobile station if the correlation value exceeds a predetermined threshold and decreases the transmission power if the correlation value does not exceed the predetermined threshold.

4. A method for controlling transmission power in a radio communication system comprising a base station and a mobile station where the base station is able to perform multi-point transmission for transmitting a same signal to intended target mobile stations among a plurality of mobile stations located in a coverage area of the base station, wherein:

the base station controls the transmission power in the multi-point transmission in accordance with a transmission power control request of which the request amount of control is the largest in the transmission power control requests from the multi-point transmission target mobile stations; and the multi-point transmission target mobile station transmits a different code sequence in accordance with the amount of control of the transmission power requested to the base station.

5. The method for controlling the transmission power as claimed in claim 4, wherein:

a set of the mobile stations consisting of the multi-point transmission target mobile stations to which the base station transmits the same signal is referred to as a multi-point transmission group; and the multi-point transmission target mobile station transmits to the base station the code sequence different in accordance with the multi-point transmission group to which that mobile station belongs and the amount of control of the transmission power requested to the base station.

6. The method for controlling the transmission power as claimed in claim 4, wherein:

the multi-point transmission target mobile station does not transmit the code sequence to the base station when that mobile station requests the base station to decrease the transmission power.

7. The method for controlling the transmission power as claimed in claim 4, wherein:

the multi-point transmission target mobile station selects one code sequence from a set of the code sequences in accordance with the amount of control of the transmission power requested to the base station where each code sequence in the set of the code sequences is associated with a different amount of control of the transmission power in advance, and transmits the selected code sequence to the base station; and the base station calculates correlation between the signal received from the multi-point transmission target mobile station and each code sequence in the set of the code sequences pre-stored, and controls the transmission power to the multi-point transmission target mobile station in accordance with the amount of control of the transmission power that is associated with the code sequence of which the correlation value exceeds a predetermined threshold.

8. The method for controlling the transmission power as claimed in claim 7, wherein:

a set of the mobile stations consisting of the multi-point transmission target mobile stations to which the base station transmits the same signal is referred to as a multi-point transmission group; and the predetermined code sequence is different for each multi-point transmission group.

9. A method for controlling transmission power in a radio communication system comprising a base station and a mobile station where the base station is able to perform multi-point transmission for transmitting a same signal to intended target mobile stations among a plurality of mobile stations located in a coverage area of the base station, wherein:

the base station controls the transmission power in the multi-point transmission in accordance with a transmission power control request of which the request amount of control is the largest in the transmission power control requests from the multi-point transmission target mobile stations; and the multi-point transmission target mobile station transmits a predetermined signal to the base station after spreading that signal with a code sequence different in accordance with the amount of control of the transmission power requested to the base station.

10. The method for controlling the transmission power as claimed in claim 9, wherein:
   a set of the mobile stations consisting of the multi-point transmission target mobile stations to which the base station transmits the same signal is referred to as a multi-point transmission group; and
   the multi-point transmission target mobile station transmits a predetermined signal to the base station after spreading that signal with a code sequence different in accordance with the multi-point transmission group to which that mobile station belongs and the amount of control of the transmission power requested to the base station.

11. The method for controlling the transmission power as claimed in claim 9, wherein:
   the multi-point transmission target mobile station does not transmit the signal spread with the code sequence to the base station when that mobile station requests the base station to decrease the transmission power.

12. The method for controlling the transmission power as claimed in claim 9, wherein:
   the multi-point transmission target mobile station selects one code sequence from a set of the code sequences in accordance with the amount of control of the transmission power requested to the base station where each code sequence in the set of the code sequences is associated with a different amount of control of the transmission power in advance, and transmits a predetermined signal to the base station after spreading that signal with the selected code sequence; and
   the base station calculates correlation between the signal received from the multi-point transmission target mobile station and each code sequence in the set of the code sequences pre-stored, performs bit decision to decide whether the correlated received signal is the predetermined signal or not, and controls the transmission power to the multi-point transmission target mobile station in accordance with the amount of control of the transmission power that is associated with the code sequence of which the correlated received signal is decided to be the predetermined signal.

13. The method for controlling the transmission power as claimed in claim 12, wherein:
   a set of the mobile stations consisting of the multi-point transmission target mobile stations to which the base station transmits the same signal is referred to as a multi-point transmission group; and
   the set of the code sequences is different for each multi-point transmission group.

14. A method for controlling transmission power in a radio communication system comprising a base station and a mobile station where the base station is able to perform multi-point transmission for transmitting a same signal to intended target mobile stations among a plurality of mobile stations located in a coverage area of the base station, wherein:
   the base station controls the transmission power in the multi-point transmission in accordance with an amount of control of the transmission power requested from the most mobile stations in the transmission power control requests from the multi-point transmission target mobile stations; and
   the multi-point transmission target mobile station transmits a different code sequence in accordance with the amount of control of the transmission power requested to the base station.

15. The method for controlling the transmission power as claimed in claim 14, wherein:
   a set of the mobile stations consisting of the multi-point transmission target mobile stations to which the base station transmits the same signal is referred to as a multi-point transmission group; and
   the multi-point transmission target mobile station transmits to the base station the code sequence different in accordance with the multi-point transmission group to which that mobile station belongs and the amount of control of the transmission power requested to the base station.

16. The method for controlling the transmission power as claimed in claim 14, wherein:
   the multi-point transmission target mobile station does not transmit the code sequence to the base station when that mobile station requests the base station to decrease the transmission power.

17. The method for controlling the transmission power as claimed in claim 14, wherein:
   the multi-point transmission target mobile station selects one code sequence from a set of the code sequences in accordance with the amount of control of the transmission power requested to the base station where each code sequence in the set of the code sequences is associated with a different amount of control of the transmission power in advance, and transmits the selected code sequence to the base station; and
   the base station calculates correlation between the signal received from the multi-point transmission target mobile station and each code sequence in the set of the code sequences pre-stored, and controls the transmission power to the multi-point transmission target mobile station in accordance with the amount of control of the transmission power that is associated with the code sequence of which the correlation value exceeds a predetermined threshold.

18. The method for controlling the transmission power as claimed in claim 17, wherein:
   a set of the mobile stations consisting of the multi-point transmission target mobile stations to which the base station transmits the same signal is referred to as a multi-point transmission group; and
   the set of the code sequences is different for each multi-point transmission group.

19. A method for controlling transmission power in a radio communication system comprising a base station and a mobile station where the base station is able to perform multi-point transmission for transmitting a same signal to intended target mobile stations among a plurality of mobile stations located in a coverage area of the base station, wherein:
   the base station controls the transmission power in the multi-point transmission in accordance with an amount of control of the transmission power requested from the most mobile stations in the transmission power control requests from the multi-point transmission target mobile stations; and
   the multi-point transmission target mobile station transmits a predetermined signal to the base station after spreading that signal with a code sequence different in accordance with the amount of control of the transmission power to the base station.

20. The method for controlling the transmission power as claimed in claim 19, wherein:
- a set of the mobile stations consisting of the multi-point transmission target mobile stations to which the base station transmits the same signal is referred to as a multi-point transmission group; and
- the multi-point transmission target mobile station transmits a predetermined signal to the base station after spreading that signal with a code sequence different in accordance with the multi-point transmission group to which that mobile station belongs and the amount of control of the transmission power requested to the base station.

21. The method for controlling the transmission power as claimed in claim 19, wherein:
- the multi-point transmission target mobile station does not transmit the signal spread with the code sequence to the base station when that mobile station requests the base station to decrease the transmission power.

22. The method for controlling the transmission power as claimed in claim 19, wherein:
- the multi-point transmission target mobile station selects one code sequence from a set of the code sequences in accordance with the amount of control of the transmission power requested to the base station where each code sequence in the set of the code sequences is associated with a different amount of control of the transmission power in advance, and transmits a predetermined signal to the base station after spreading that signal with the selected code sequence; and
- the base station calculates correlation between the signal received from the multi-point transmission target mobile station and each code sequence in the set of the code sequences pre-stored, performs bit decision to decide whether the correlated received signal is the predetermined signal or not, and controls the transmission power to the multi-point transmission target mobile station in accordance with the amount of control of the transmission power that is associated with the code sequence of which the correlated received signal is decided to be the predetermined signal.

23. The method for controlling the transmission power as claimed in claim 22, wherein:
- a set of the mobile stations consisting of the multi-point transmission target mobile stations to which the base station transmits the same signal is referred to as a multi-point transmission group; and
- the set of the code sequences is different for each multi-point transmission group.

24. A communication terminal device acting as a mobile station communicating with a base station in a radio communication system where the base station is able to perform multi-point transmission for transmitting a same signal to intended target mobile stations among a plurality of mobile stations located in a coverage area of the base station and comprising a transmission power control requesting part for requesting the base station to increase or decrease the transmission power on the basis of a receiving quality of a received signal from the base station, wherein:
- the transmission power control requesting part provides the base station with an increase request or a decrease request of the transmission power by respectively transmitting or not transmitting a predetermined signal to the base station; and
- upon being targeted for the multi-point transmission where the same signal is transmitted from the base station, the transmission power control requesting part uses, in signals provided to be different for each multi-point transmission group, a signal assigned for the multi-point transmission group as the predetermined signal.

25. A communication terminal device acting as a mobile station communicating with a base station in a radio communication system where the base station is able to perform multi-point transmission for transmitting a same signal to intended target mobile stations among a plurality of mobile stations located in a coverage area of the base station and comprising a transmission power control requesting part for requesting the base station to increase or decrease the transmission power on the basis of a receiving quality of a received signal from the base station, wherein:
- the transmission power control requesting part provides the base station with an increase request or a decrease request of the transmission power by respectively transmitting or not transmitting a predetermined signal to the base station; and
- the predetermined signal is a predetermined code sequence.

26. A communication terminal device acting as a mobile station communicating with a base station in a radio communication system where the base station is configured to perform multi-point transmission for transmitting a same signal to intended target mobile stations among a plurality of mobile stations located in a coverage area of the base station and comprising a transmission power control requesting part for requesting the base station to increase or decrease the transmission power on the basis of a receiving quality of a received signal from the base station, wherein:
- the transmission power control requesting part transmits a different code sequence in accordance with an amount of control of the transmission power requested to the base station.

27. The communication terminal device as claimed in claim 26, wherein:
- upon being targeted for the multi-point transmission where the same signal is transmitted from the base station, the transmission power control requesting part uses, in code sequences provided to be different for each multi-point transmission group, a code sequence assigned for the multi-point transmission group as the code sequence.

28. The communication terminal device as claimed in claim 26, wherein:
- the communication terminal device does not transmit the code sequence to the base station when that mobile station requests the base station to decrease the transmission power.

29. A communication terminal device acting as a mobile station communicating with a base station in a radio communication system where the base station is configured to perform multi-point transmission for transmitting a same signal to intended target mobile stations among a plurality of mobile stations located in a coverage area of the base station and comprising a transmission power control requesting part for requesting the base station to increase or decrease the transmission power on the basis of receiving quality of received signal from the base station, wherein:
- the transmission power control requesting part transmits a predetermined signal to the base station after spreading that signal with a code sequence different in accordance with the amount of control of the transmission power requested to the base station.

30. The communication terminal device as claimed in claim 29, wherein:

upon being targeted for the multi-point transmission where the same signal is transmitted from the base station, the transmission power control requesting part uses, in code sequences provided to be different for each multi-point transmission group, a code sequence assigned for the multi-point transmission group as the code sequence.

31. The communication terminal device as claimed in claim 29, wherein:

the communication terminal device does not transmit the predetermined signal spread with the code sequence to the base station when that mobile station requests the base station to decrease the transmission power.

* * * * *